Jan. 16, 1968  M. F. PARRISH ET AL  3,363,923
PNEUMATICALLY OPERATED ABRASIVE DISTRIBUTOR
Filed Oct. 19, 1965  2 Sheets-Sheet 2
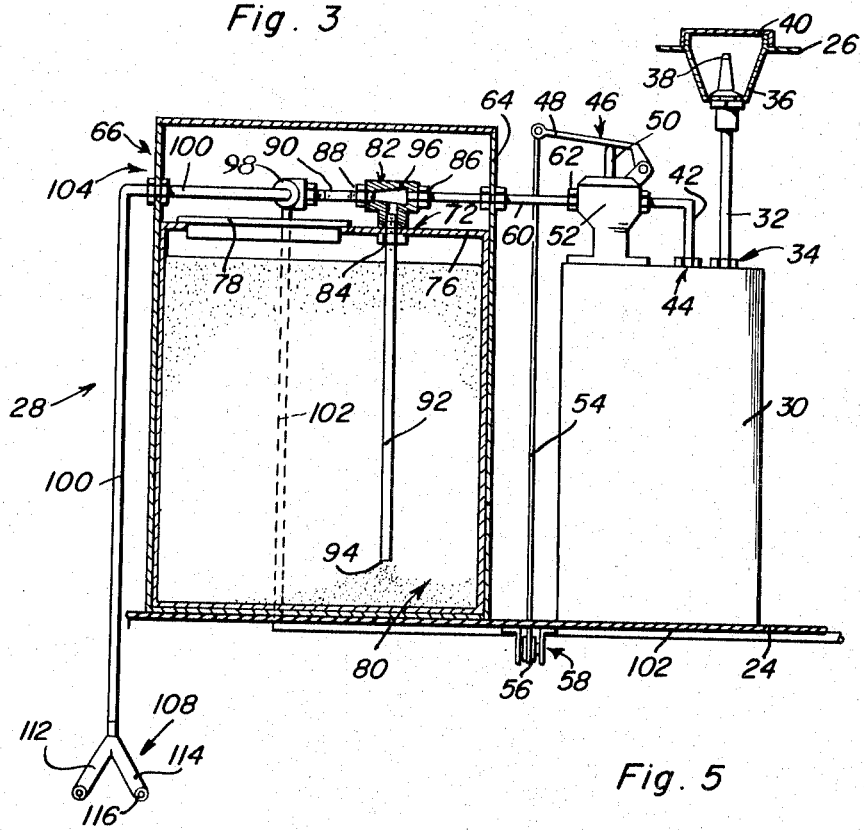
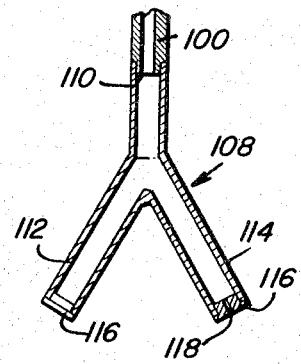
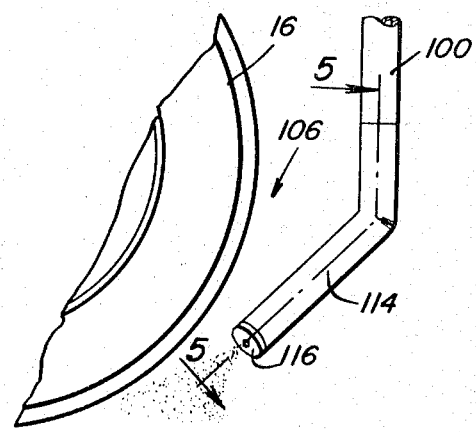
Myles F. Parrish
Marion F. Parrish
INVENTORS
BY Clarence A. O'Brien
and Harvey B. Jacobson
Attorneys United States Patent Office 3,363,923
Patented Jan. 16, 1968

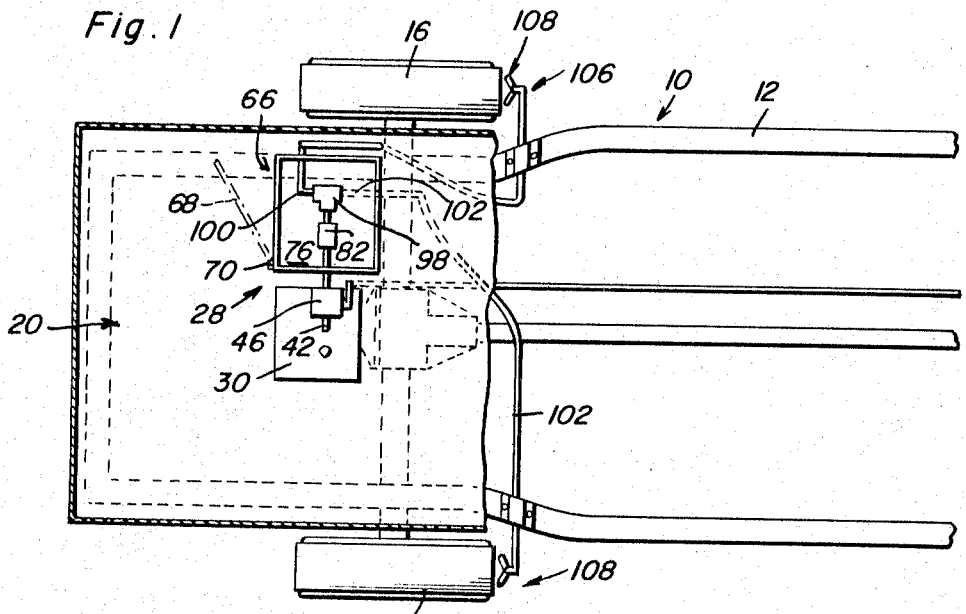
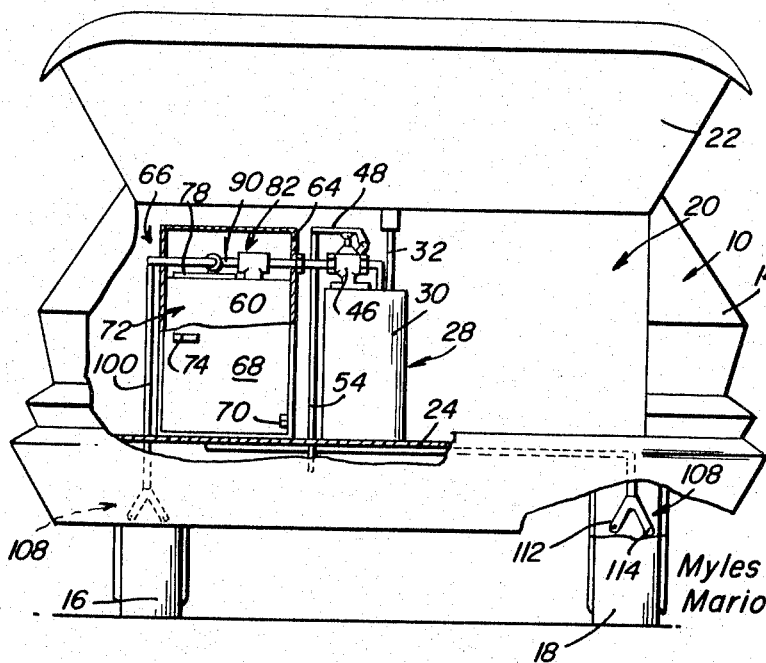

3,363,923
PNEUMATICALLY OPERATED ABRASIVE
DISTRIBUTOR
Myles F. Parrish and Marion F. Parrish, both of 607 W.
Jefferson St., Decatur, Ind. 46733
Filed Oct. 19, 1965, Ser. No. 497,744
4 Claims. (Cl. 291—3)

ABSTRACT OF THE DISCLOSURE

A high pressure air discharge line having one end communicated with a source of air under high pressure and the other end disposed for discharge adjacent a selected ground engaging wheel of a vehicle, the discharge line being provided with valve means operable to initiate and terminate free flow of air under pressure from the inlet end to the outlet end and a hopper of granular material being communicated with the high pressure air discharge line downstream of the valve means by means of an eduction tube having its inlet end disposed in the lower portion of the hopper for granular material.

---

This invention relates generally to skid control devices for motor vehicles and more particularly to a pneumatic abrasive material spreading device for preventing the skidding of motor vehicles on slippery surfaces such as ice or water covered pavements.

Briefly, this invention comprises a sand source mounted in a motor vehicle with said outlets opening to a leading face of the vehicle tires and a compressed air source mounted in the vehicle for carrying the sand from the source to the wheels in order to selectively spread the sand in front of the wheels to provide friction therefor and thereby prevent skidding of the vehicle.

Conventional gravity feed abrasive delivery skid control devices have been developed and are known in the prior art, but these devices have proved to be ineffective as they become clogged and hence inoperative rather frequently. The instant invention obviates this difficulty of the prior art devices inasmuch as the compressed air used for delivering the abrasive material keeps the delivery lines clear of obstructions.

It is an object of the present invention to provide novel skid preventing apparatus mounted in a motor vehicle which may be selectively operated by the vehicle driver in order to spread a friction-type material such as sand, salt or ashes under the wheels of the vehicle.

It is another object of the present invention to provide a novel sand-spreading device mounted on a motor vehicle, with control means for allowing the driver to deliver the sand to the vehicle wheels so as to permit the tires to obtain a firm grip on the roadway.

It is a further object of the present invention to provide novel abrasive material delivery apparatus for use in a motor vehicle skid control appliance.

It is a still further object of the present invention to provide novel pneumatically operated delivery means for delivering sand from a sand hopper to a novel sand-spreading head mounted adjacent the wheels of a motor vehicle.

These together with other objects and advantages which will become subsequently apparent reside in the details of construction and operation as more fully hereinafter described and claimed, reference being had to the accompany drawings forming a part hereof, wherein like numerals refer to like parts throughout, and in which:

FIGURE 1 is a view partially in plan and partially in horizontal cross section of a motor vehicle frame with running gear thereon and having the skid control appliance of the present invention mounted therein;

FIGURE 2 is a rear elevational view with parts broken away and partially in vertical cross section illustrating a motor vehicle having the skid control appliance mounted therein;

FIGURE 3 is a view partially in elevation and partially in vertical cross section of the skid control appliance comprising the present invention;

FIGURE 4 is a partial side elevational view of the novel spreading head comprising a portion of the present invention;

FIGURE 5 is a vertical sectional view taken substantially on the plane of the line 5—5 of FIGURE 4.

Referring now more particularly to the drawings, reference numeral 10 generally denotes a motor vehicle such as an automobile or the like, the vehicle including a conventional frame 12, body 14 and pair of rear wheels 16 and 18 mounted thereon. The vehicle conventionally has a trunk 20 at the rear thereof, with a trunk lid 22 hingedly mounted for selectively closing the trunk 20. The trunk includes a floor 24 and the vehicle includes a rear window ledge 26 which forms a portion of the top of the trunk 20.

The pneumatic skid control appliance of the present invention is generally denoted by reference numeral 28 and is preferably mounted in the vehicle trunk 20 in order to be out of sight, while at the same time being readily accessible merely by lifting the trunk lid 22. The pneumatic skid control appliance includes a compressed air tank 30 which contains a quantity of air at approximately 150 lbs./sq. in. pressure. The compressed air tank 30 is mounted on the trunk floor 24, and includes an inlet filling conduit 32 connected to the top thereof as at 34. The conduit extends upwardly to a recess 36 in the window ledge 26 and has a valve such as a well known schrader valve 38 at the end thereof opening to recess 36. A cap 40 is provided to cover the recess 36 in order to allow selective access to the valve 38 in order to recharge the tank 30 when necessary, while at the same time hiding the valve 38 from sight.

The outlet conduit 42 is connected at the other end to a lever-actuated valve 46, which valve 46 is mounted on the top of the tank 30. The valve 46 has a lever actuator 48 mounted thereon and a valve plunger 50 extending upwardly from the valve body 52 and slidable inwardly of the body 52 by the lever 48 in order to actuate the valve. Connected to the end of lever 48 for actuation thereof is a control cable 54 which extends downwardly over a pulley 56 mounted as indicated by reference numeral 58 under the trunk floor 24. The pulley 56 is provided to change direction of the control cable 54, thereby directing the control cable to the vehicle driver compartment adjacent the driver's seat at which point the control cable is mounted so as to be actuatable by the vehicle driver. While this mounting of the control cable 54 is not illustrated, it will be readily apparent to one skilled in the art that any conventional dashboard mounting thereof may be readily effected. Thus, it will be appreciated that the driver of the vehicle may operate the valve 46 from the driver compartment in order to pass compressed air from tank 30 through the valve 46.

An airflow conduit 60 is connected to the outlet side 62 of valve 46, the airflow conduit 60 extending through a wall 64 of a hopper mounting container 66, which container is mounted on the trunk floor 24. The container 66 has a door 68 mounted on the rear end thereof by conventional hinges 70. Mounted within the container 66 is a sandbox or hopper 72 of box-like construction. The hopper 72 has side and bottom walls which are closely encased in the container 66 when the container door 68 is closed. However, the container door 68 may be opened by means of a handle 74 thereon to provide access to the hopper 72. The hopper 72 further includes an opening in the top wall 76 thereof, the opening being normally tightly closed by the cap or cover 78, whereby the hopper 72 will be substantially moisture-proof. Contained within the hopper 72 is a quantity of fine grain sandblast type sand 80, the sand, when depleted being refilled through the top opening. Of course, it will be appreciated that other abrasive-type materials may be contained within the hopper 72 such as, for example, salt, ashes or the like.

A threaded T-connector 82 has its intermediate leg 84 mounted through an opening in the top wall 76 of hopper 72, the inlet and outlet legs 86 and 88 of the T-connector 82 extending toward the side walls of the container 66. The airflow conduit 60 is threadedly received in the inlet leg 86 of T-connector 82, and an outlet airflow conduit 90 is threadedly received in the outlet leg 88 of T-connector 82. Further, a tubular conduit 92 is threadedly received in the intermediate leg 84 of T-connector 82, the conduit 92 extending downwardly into the sand 80 contained in the hopper 72. Of course, it will be appreciated that the end 94 of tubular conduit 92 is open, and thus the sand 80 is free to move upwardly in the conduit 92.

The T-connector 82 has a venturi-type air jet flow channel 96 therein, the larger diameter portion of the flow channel 96 being adjacent the inlet leg 86 and the smaller diameter portion being adjacent the outlet leg 88. Thus, it will be readily understood that flow of air through the air jet from the compressed air tank 30 causes a reduction in pressure within the air jet chamber which will draw in the granular sand through the open end 94 in conduit 92. Further, upon meeting the stream of air flowing through the air jet flow channel 96, the granular material will be carried rapidly outwardly through the outlet leg 88 of the T-connector 82 and into the outlet airflow conduit 90.

The outlet airflow conduit 90 is connected to a threaded T-connector 98, the T-connector 98 having a pair of delivery conduits 100 and 102 extending therefrom. The delivery conduits 100 and 102 extends through the side walls of container 66, as indicated for example by reference numeral 104, the delivery conduit 100 extending to a delivery station 106 adjacent the leading face of the rear wheel 16 and the delivery conduit 102 extending to a delivery station 108 adjacent the leading face of rear wheel 18.

Each of the delivery conduits 100 and 102 is preferably of a conventional copper conduit in order to be substantially rust-free as well as being easily mounted in the vehicle. The conduits 100 and 102 each has an identical bifurcated material spreading head 108 mounted against the shoulders of the reduced end portion 110 thereof. Each bifurcated spreading head 108 includes the legs 112 and 114, each of the legs being tubular and open at the end, and having an outlet plug 116 removably mounted in the end. The plugs 116 each includes an aperture 118 therein for allowing the granular material to be spread in front of the vehicle wheel. Of course, it will be appreciated that due to the fiburcated nature of the head 108, the granular material will be spread in a predetermined pattern in front of the rear wheel, it being anticipated that the angle between the legs 112 and 114 will provide the most favorable diffusion of the granular abrasive material under the vehicle wheel.

In view of the foregoing description, it will be appreciated that the vehicle operator may cause abrasive granular material to be conveyed to the front of the vehicle rear wheels merely by operating the control cable 54 in order to cause the compressed air to flow through the conduit 60 to the air jet flow channel 96. At this time the velocity of the air will be substantially increased and the pressure lowered and the granular material 80 contained in the hopper 72 will be drawn upwardly into the flow path of the air and outwardly to the delivery conduits 100 and 102 and ultimately will be spread by the delivery heads 108 under the vehicle wheels. Of course, it should be appreciated that additional delivery heads could be added to the instant skid control appliance in order to spread the abrasive material under each of the vehicle wheels and thus provide additional frictional engaging surfaces for the vehicle wheels in order to obviate the possibility of skidding. It is anticipated that the vehicle driver will use the skid control appliance in the following manner: before applying the vehicle brakes, the driver will activate the valve 46 thus releasing the compressed air to draw the abrasive material from the hopper 72 and blow it on the slippery pavement directly in front of the rear wheels. At this time, the driver will apply the brakes, and the tires will have added traction on a wet or slippery pavement thereby making it easier to control the vehicle. Of course, since only approximately 24 square inches of each tire is in contact with the pavement, only a small amount of abrasive material will be necessary to stop a car from skidding, and the compressed air flowing at high speed through the various conveying conduits of the instant skid control appliance insures that such abrasive material will be conveyed to the vehicle tires in a most rapid fashion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle of the type including ground engaging support wheels, substantially closed hopper means mounted on said vehicle containing a supply of abrasive material, a source of air under high pressure mounted on said vehicle, discharge nozzle means on said vehicle positioned to discharge a jet of fluent material therefrom for engagement by selected wheels of said vehicle during movement of the latter over the ground, air conduit means communicating said source with said nozzle means for discharge of air from said source outwardly of said nozzle means, an upstanding eduction tube including a lower inlet end disposed in the lower portion of said hopper for passage of said abrasive material thereinto and an upper outlet end opening into said air conduit means in a zone thereof spaced intermediate said source and said nozzle means and adapted to form a reduced pressure therein in response to rapid flow of air through said air conduit means from said source to said nozzle means, whereby abrasive material from said hopper will be drawn upward into said zone through said eduction for mixing with the air passing through said air conduit means and being discharged from said nozzle means, and remotely operable valve means disposed in said air conduit means upstream from said zone and operable to initiate and terminate free flow of air under pressure from said source to said nozzle means.

2. The combination of claim 1 wherein said nozzle means comprises at least one nozzle head positioned adjacent the leading face of a driving rear wheel of said vehicle, said nozzle head having a bifurcated end for spreading said abrasive material in a predetermined pattern under said rear wheel.

3. The combination of claim 1 wherein said nozzle means comprises a pair of nozzle heads each positioned adjacent the leading face of one of said vehicle rear wheels, said nozzle heads each having a bifurcated end for spreading said abrasive material in a predetermined pattern under said rear wheels.

4. The combination of claim 1 wherein said air conduit means includes a T-connector disposed downstream from said zone having an inlet for receiving air and abrasive material from said zone and a pair of outlets, said nozzle means including a pair of outlet nozzles disposed on the outlet ends of said branches of said conduit means.

References Cited

UNITED STATES PATENTS

| | | | |
|---|---|---|---|
| 929,877 | 8/1909 | Quin | 291—24 |
| 1,110,391 | 9/1914 | Kelt | 291—24 |
| 1,795,105 | 3/1931 | Buyck | 291—3 |
| 2,016,419 | 10/1935 | Elston | 291—24 |
| 2,999,711 | 9/1961 | Strumer | 291—3 |
| 3,198,137 | 8/1965 | White | 291—3 |

ARTHUR L. LA POINT, *Primary Examiner.*

H. BELTRAN, *Assistant Examiner.*